United States Patent Office 3,311,670
Patented Mar. 28, 1967

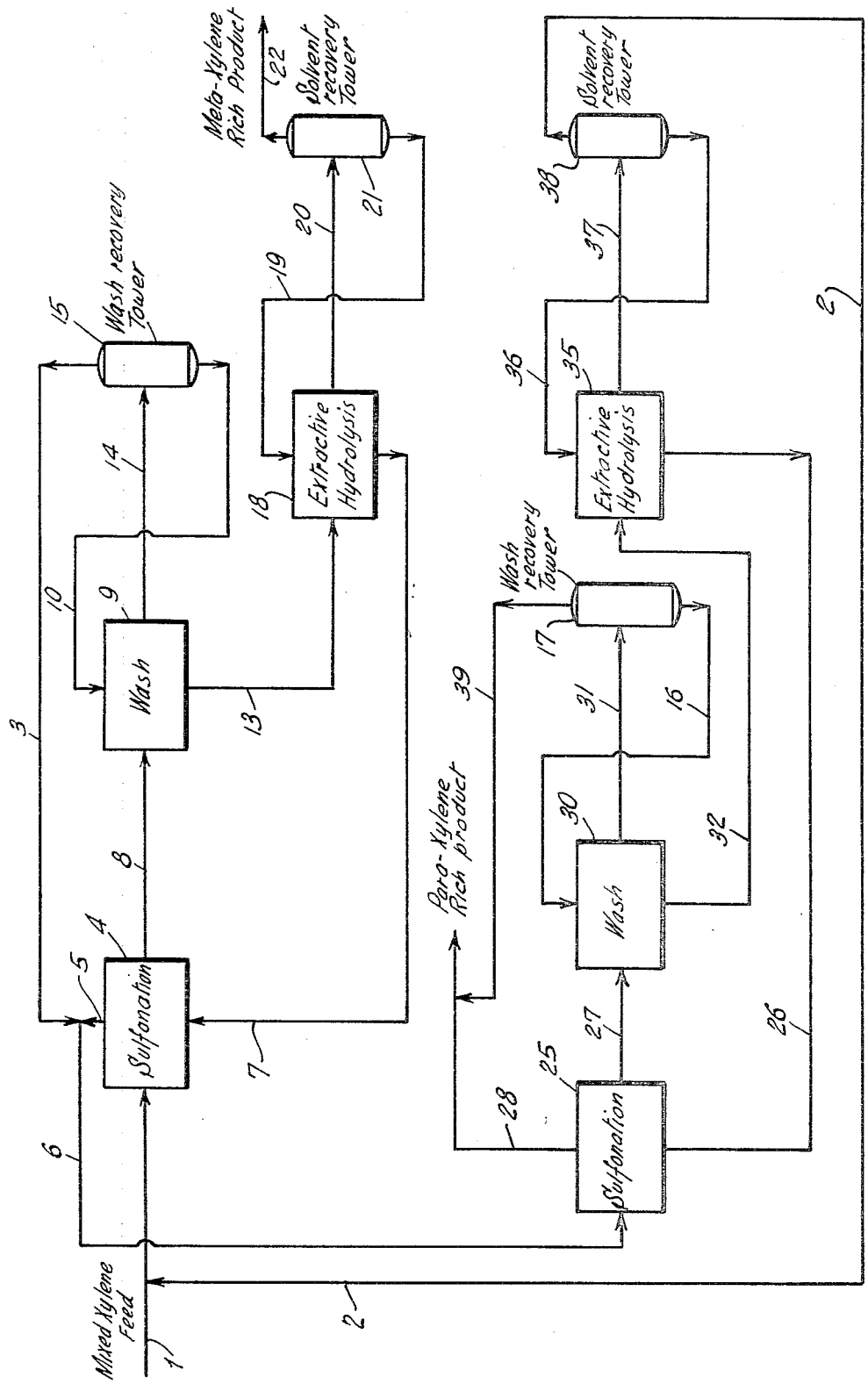

3,311,670
PROCESS FOR SEPARATION OF AROMATIC HYDROCARBONS
William Smolin, Beacon, N.Y., assignor to Texaco Inc., New York, N.Y., a corporation of Delaware
Filed July 17, 1963, Ser. No. 295,660
9 Claims. (Cl. 260—674)

This invention relates to a process for separating hydrocarbon mixtures and more particularly for the separation of mixtures of isomeric xylenes.

In accordance with this invention, a hydrocarbon mixture comprising meta-xylene and para-xylene is contacted with aqueous sulfuric acid at a temperature effecting formation of a hydrocarbon phase enriched in para-xylene and an acid phase comprising meta-xylenesulfonic acid. The hydrocarbon phase enriched in para-xylene is separately withdrawn and the acid phase is contacted with a paraffinic hydrocarbon solvent at a temperature effecting hydrolysis of dissolved meta-xylenesulfonic acid and regeneration of sulfuric acid forming an extract phase comprising meta-xylene in said solvent. A hydrocarbon stream enriched in meta-xylene and solvent are then separated from said extract phase.

The $C_8$ aromatics, ortho-xylene, meta-xylene, para-xylene, and ethylbenzene, can be separated as a group from aromatic extracts obtainable from catalytic reformate by fractional distillation. Further separation of each of the $C_8$ components in pure form by fractional distillation is difficult because of the nearness of their boiling points as set forth in the following tabulation:

| Component: | Boiling point degrees F. |
| --- | --- |
| Ethylbenzene | 277.1 |
| Para-xylene | 281.0 |
| Meta-xylene | 282.4 |
| Ortho-xylene | 292.0 |

Although ortho-xylene and ethylbenzene can be separated by superfractionation, separation of meta-xylene and para-xylene in pure form by distillation is not considered commercially feasible.

Meta-xylene is sulfonated more rapidly than para-xylene in aqueous sulfuric acid solutions. This difference in reaction rates provides a means for separating these two isomers. Numerous xylene separation processes based upon this selective sulfonation have been proposed but none is known to be currently in commercial operation. One reason that selective sulfonation has not been commercially attractive is that the sulfonation mixture has usually been diluted with water to effect rapid and complete hydrolysis so that the regenerated sulfuric acid is of lower acidity and must be fortified for reuse. The principal commercial method for separation of para-xylene has therefore been the use of fractional crystallization. Fractional crystallization may require the use of temperatures as low as −60° F. or lower to effect recovery of a substantial portion of the para-xylene. Recovery of pure para-xylene is limited by the formation of a para-xylene and meta-xylene eutectic. Furthermore, since a eutectic is formed only one component is readily separated in pure form and this component is determined by the composition of the charge mixture.

In accordance with the present invention, the disadvantages of the prior art are avoided by employing sulfonation and hydrolysis without water dilution. I have found that the sulfonation reaction may be reversed to effect hydrolysis with the water present in the acid solution by raising the temperature only slightly in the presence of a paraffinic hydrocarbon solvent. The paraffinic hydrocarbon continuously extracts the meta-xylene as it is formed as a product of hydrolysis. By continuously withdrawing the meta-xylene from contact with the acid phase, the equilibrium is displaced so that rapid and substantially complete hydrolysis may be effected without dilution of the regenerated acid.

Sulfonation of mixtures of meta-xylene and para-xylene for their selective separation is effected at a temperature within the range of about 150 to 225° F. acid concentration within the range of about 76 to 84 weight percent sulfuric acid, and with an acid to hydrocarbon weight ratio within the range of about 4:1 to 20:1. Increasing temperature up to about 200° F. has little effect upon selectivity, whereas selectivity is adversely affected at temperatures above 200° F. Selectivity is not greatly affected by variations in acid concentration or dosage within the ranges specified. A sulfuric acid concentration of about 80 percent, an acid dosage of 10:1 weight ratio of acid to xylene charge, and a contacting temperature of about 200° F. are preferred.

Extraction-hydrolysis is effected at temperatures within the range of about 275° F. to 325° F. with a solvent to sulfonation reaction mixture ratio of about 0.05 to 0.5. Solvent dosages low enough to provide xylene concentrations of about 20 percent are preferred to minimize the cost of recovering xylene from solvent while still effecting rapid and complete hydrolysis. Suitable hydrocarbon solvents include, for example, normal and branched chain paraffinic hydrocarbons, having boiling points or boiling ranges outside the range of the xylene feed stock to facilitate separation by distillation. Straight chain paraffinic hydrocarbons, for example normal cetane, are preferred. Counter-current contacting of acid and solvent phases is preferred.

Acid solutions containing xylenesulfonic acids exert a solvent action on para-xylene so that the sulfonation reaction mixture contains some dissolved para-xylene. This para-xylene may be separated prior to hydrolysis to increase the selectivity of separation in the combined separation by sulfonation and extraction-hydrolysis. Advantageously, a paraffinic hydrocarbon solvent, which may be the same solvent employed in the extraction-hydrolysis, is contacted with the sulfonation reaction mixture at low temperature for example, at a temperature within the range of about 60 to 225° F., to effect extraction of the para-xylene. Xylene of increased purity may be separated by employing a plurality of stages of sulfonation and extraction-hydrolysis. Alternatively, the sulfonation extraction-hydrolysis method may be combined with conventional crystallization to provide a high purity feed for crystallization so that very high purity xylenes may be produced with a minimum amount of crystallization equipment and operating expense.

The accompanying drawing and example illustrate one form of the process of this invention. Although the drawing diagrammatically illustrates one arrangement of apparatus in which the process of this invention may be practiced, it is not intended to limit the inventon to the particular apparatus or materials described.

A mixed xylene feed stream comprising meta-xylene and para-xylene in line 1 is combined with recycle xylene stream from line 2 and passed to sulfonation zone 4. In sulfonation zone 4, the xylene feed is contacted with sulfuric acid effecting selective sulfonation of meta-xylene forming meta-xylenesulfonic acid in acid solution. Hydrocarbon raffinate, enriched in para-xylene, is withdrawn through line 5 and acid phase comprising meta-xylenesulfonic acid and some dissolved xylnes is withdrawn through line 8 to wash facility 9. The acid phase is contacted with paraffinic hydrocarbon solvent from line 10 in wash facility 9 effecting transfer of dissolved xylenes to the wash solvent. Washings are discharged thorugh line 14 to wash recovery tower 15. Wash recovery tower 15 may be, for example, a distillation tower effecting separation of xylene as distillate, withdrawn through line 3, and wash solvent as bottoms, withdrawn through line 10.

The acid phase containing meta-xylenesulfonic acid from wash facility 9 is withdrawn through line 13 and passed to extractive hydrolysis zone 18. In extractive hydrolysis zone 18, the acid phase is contacted with a paraffinic hydrocarbon solvent from line 19 at a temperature of about 300° F. effecting hydrolysis of the meta-xylenesulfonic acid and transfer of the resulting meta-xylene to the hydrocarbon solvent. Regenerated sulfuric acid is withdrawn through line 7 and returned to sulfonation zone 4. Solvent containing meta-xylene is withdrawn through line 20 and passed to solvent recovery distillation tower 21 where meta-xylene rich product is separated as an overhead distillate through line 22 and recovered solvent is separated as bottoms withdrawn through line 19.

Raffinate from sulfonation zone 4, withdrawn through line 5, is combined with xylene distillate from line 3 and is passed through line 6 to sulfonation zone 25 wherein the xylene enriched in para-xylene but containing some meta-xylene is contacted with acid introduced through line 26 effecting sulfonation of remaining meta-xylene. Para-xylene rich product is withdrawn as raffinate through line 28 and acid phase comprising meta-xylene-sulfonic acid and some dissolved xylenes is withdrawn through line 27 to wash zone 30. In wash zone 30 the acid containing meta-xylenesulfonic acid and dissolved xylenes is washed with hydrocarbon solvent from line 16. The hydrocarbon washings are discharged through line 31 to wash recovery tower 17. Wash recovery tower 17 may be, for example a distillation tower effecting separation of xylene as distillate, withdrawn through line 39 and wash solvent as bottoms, withdrawn through line 16. Xylene distillate from line 39 is combined with raffinate from line 28 as para-xylene rich product. The washed acid phase containing meta-xylenesulfonic acid is passed through line 32 to extractive hydrolysis zone 35. In extractive hydrolysis zone 35 paraffinic hydrocarbon solvent is introduced through line 36 and the mixture heated to a temperature of about 300° F. effecting hydrolysis of the meta-xylenesulfonic acid and transfer of the resulting meta-xylene to the hydrocarbon solvent. Washings comprising hydrocarbon solvent and dissolved meta-xylene are discharged through line 37 and regenerated acid is withdrawn through line 26 for recycle to sulfonation zone 25. Washings in line 37 are passed to distillation tower 38. Mixed xylenes are withdrawn as distillate through line 2 for recycle to sulfonation zone 4 and recovered paraffinic solvent is separated as bottoms through line 36.

*Example*

In an example of the process of this invention, a xylene feed stock comprising 35 percent para-xylene and 65 percent meta-xylene is passed at a rate of 100 barrels per day together with 44.0 barrels per day of xylene recycle to a primary sulfonation zone. In the primary sulfonation zone, the xylenes are contacted with sulfuric acid of 80 weight percent strength at a dosage of 10 lbs. of acid per pound of xylene, at a temperature of 200° F., and for a time of 1 hour. Hydrocarbon raffinate comprising 68.4 weight percent para-xylene and 31.6 weight percent meta-xylene is separated from acid containing meta-xylenesulfonic acid and dissolved xylenes. The acid phase is washed with 108.2 barrels per day of cetane at a temperature of 100° F. separating the dissolved xylenes. The washed, acid phase is passed to an extractive hydrolysis zone at a rate of 817.4 barrels per day where it is contacted with 353.6 barrels per day of cetane at a temperature of 300° F. and a contact time of 5 minutes. Regenerated acid is separated and returned to the sulfonation zone. Hydrocarbon solvent and extracted meta-xylene are distilled separating 79.2 barrels per day of meta-xylene rich product comprising 81.5 percent meta-xylene and 18.5 percent para-xylene, from the solvent which is recycled to the extractive hydrolysis step.

Raffinate from the primary sulfonation zone at a rate of 51.8 barrels per day plus 12.9 barrels per day of xylene distillate from the wash recovery tower comprising 68.4 percent meta-xylene and 31.6 percent para-xylene is passed to a secondary sulfonation zone where it is contacted with 10 lbs. of sulfuric acid of 80 weight percent strength per pound of xylene at a temperature of 200° F. and for a contact time of 2 hours. A hydrocarbon raffinate is separated comprising para-xylene of 98 percent purity at a rate of 16.6 barrels per day.

Acid phase comprising meta-xylenesulfonic acid and dissolved xylenes is washed with 34.6 barrels per day of cetane at 100° F. Washings from the secondary sulfonation product are distilled separating 4.1 barrels per day of xylene distillate comprising para-xylene of 98 percent purity. Hydrocarbon raffinate from the secondary sulfonation zone and xylene distillate from the washings from the washings from the secondary sulfonation product are combined as para-xylene rich product. The yield of para-xylene is 58 percent of the para-xylene contained in the fresh feed. The washed secondary sulfonate is contacted with 196.0 barrels per day of cetane at a temperature of 300° F. for a time of 5 minutes effecting hydrolysis of the sulfonates and regeneration of the acid. Acid is separated and returned to the secondary sulfonation zone and the hydrocarbon extract is distilled separating 44.0 barrels per day of mixed xylenes which are recycled to the primary sulfonation zone feed.

I claim:
1. A method for the separation of xylene isomers from a hydrocarbon mixture comprising meta-xylene and para-xylene which comprises
    contacting said hydrocarbon mixture with aqueous sulfuric acid of 76 to 84 weight percent strength, at a temperature within the range of 150 to 225° F., and at an acid to hydrocarbon weight ratio within the range of 4:1 to 20:1 effecting formation of a hydrocarbon phase enriched in para-xylene and an acid phase comprising meta-xylenesulfonic acid,
    separately withdrawing said hydrocarbon phase enriched in para-xylene,
    contacting said acid phase with a paraffinic hydrocarbon solvent at a temperature within the range of 275 to 325° F., at a solvent to acid phase weight ratio within the range of 0.05:1 to 0.5:1 effecting regeneration of sulfuric acid and hydrolysis of dissolved meta-xylenesulfonic acid forming an extract phase comprising meta-xylene in said solvent,
    and separating a hydrocarbon stream enriched in meta-xylene and solvent from said extract phase.

2. The process of claim 1 wherein said hydrocarbon mixture is contacted with sulfuric acid of about 80 weight percent strength.

3. The process of claim 1 wherein said hydrocarbon mixture is contacted with sulfuric acid at about 200° F.

4. The process of claim 1 wherein said acid phase is contacted with said paraffinic hydrocarbon solvent at a temperature within the range of about 275 to 300° F.

5. A method for the separation of xylene isomers from a hydrocarbon mixture comprising meta-xylene and para-xylene which comprises
    contacting said hydrocarbon mixture with aqueous sulfuric acid of 76 to 84 weight percent strength, at a temperature within the range of 150 to 225° F., and at an acid to hydrocarbon weight ratio within the range of 4:1 to 20:1 effecting formation of a hydrocarbon phase enriched in para-xylene and an acid phase comprising meta-xylenesulfonic acid and some dissolved xylenes,
    contacting said acid phase with a paraffinic hydrocarbon solvent at a temperature within the range of 60 to 225° F. effecting extraction of dissolved xylenes forming a raffinate comprising acid and meta-xylenesulfonic acid and an extract comprising xylenes, separating xylenes from said extract, contacting said raffinate with a paraffinic hydrocarbon solvent at a temperature within the range of 275 to 325° F. and at a solvent to acid phase ratio within the range of 0.05:1 to 0.5:1 effecting regeneration of sulfuric acid and hydrolysis of dissolved meta-xylenesulfonic acid forming an extract phase comprising meta-xylene in said solvent, and separating a hydrocarbon stream enriched in meta-xylene and solvent from said extract phase.

6. A method for the separation of xylene isomers from a hydrocarbon mixture comprising meta-xylene and para-xylene which comprises contacting said hydrocarbon mixture and a recycle stream comprising meta-xylene as provided hereinafter with aqueous sulfuric acid of 76 to 84 weight percent strength at a temperature in the range of 150 to 225° F., and at an acid to hydrocarbon ratio within the range of 4:1 to 20:1 effecting formation of a first hydrocarbon phase enriched in para-xylene and a first acid phase comprising meta-xylenesulfonic acid, contacting at least a portion of said first acid phase with a paraffinic hydrocarbon solvent at a temperature within the range of 275 to 325° F. and at a solvent to acid phase ratio within the range of 0.05:1 to 0.5:1 effecting regeneration of sulfuric acid and hydrolysis of dissolved meta-xylenesulfonic acid forming a first extract phase comprising meta-xylene in said solvent, separating a hydrocarbon stream comprising meta-xylene as a product of the process and solvent from said first extract phase, contacting said first hydrocarbon phase enriched in para-xylene with aqueous sulfuric acid of 76 to 84 weight percent strength at a temperature within the range of 150 to 225° F., and at an acid to xylene ratio within the range of 4:1 to 20:1 effecting formation of a second hydrocarbon phase enriched in para-xylene and an acid phase comprising meta-xylenesulfonic acid, separately withdrawing said second hydrocarbon phase enriched in para-xylene as a product of the process, contacting at least a portion of said second acid phase with a paraffinic hydrocarbon solvent at a temperature within the range of 275 to 325° F. and at a solvent to acid phase ratio within the range of 0.05:1 to 0.5:1 effecting regeneration of sulfuric acid and hydrolysis of dissolved meta-xylenesulfonic acid forming a second extract phase comprising meta-xylene in said solvent, separating a second hydrocarbon stream comprising meta-xylene and solvent from said second extract phase, and contacting at least a part of said second hydrocarbon stream comprising meta-xylene with aqueous sulfuric acid as the aforesaid recycle stream comprising meta-xylene.

7. The method of claim 6 wherein said first acid phase is contacted with a paraffinic hydrocarbon solvent at a temperature within the range of 60 to 225° F. effecting extraction of dissolved xylenes forming a third raffinate comprising acid and meta-xylenesulfonic acid and a third extract comprising xylenes, and said third raffinate is contacted with a paraffinic hydrocarbon solvent at a temperature within the range of 275 to 325° F. and at a solvent to acid phase ratio within the range of 0.05:1 to 0.5:1 effecting regeneration of sulfuric acid and hydrolysis of dissolved meta-xylenesulfonic acid forming said first extract phase comprising meta-xylene in said solvent.

8. The method of claim 7 wherein said third extract is separated into solvent and xylene fractions and the separated xylene fraction is combined with said first hydrocarbon phase enriched in para-xylene.

9. The method of claim 7 wherein said second acid phase is contacted with a paraffinic hydrocarbon solvent at a temperature within the range of 60 to 225° F. effecting extraction of dissolved xylenes forming a fourth raffinate comprising acid and meta-xylenesulfonic acid and a fourth extract comprising xylenes.

References Cited by the Examiner
UNITED STATES PATENTS

| | | | |
|---|---|---|---|
| 2,519,336 | 8/1950 | Beach et al. | 260—674 |
| 2,802,888 | 8/1957 | Stuart | 260—674 |

DELBERT E. GANTZ, *Primary Examiner.*

C. E. SPRESSER, *Assistant Examiner.*